United States Patent
Kwon

(10) Patent No.: US 10,575,284 B2
(45) Date of Patent: Feb. 25, 2020

(54) SYSTEMS AND METHODS FOR MULTI-USER TRANSMISSION

(71) Applicant: NEWRACOM, INC., Irvine, CA (US)

(72) Inventor: Younghoon Kwon, Laguna Niguel, CA (US)

(73) Assignee: NEWRACOM, INC., Lake Forest, CA (US)

( * ) Notice: Subject to any disclaimer, the term of this patent is extended or adjusted under 35 U.S.C. 154(b) by 35 days.

(21) Appl. No.: 14/998,172

(22) Filed: Dec. 23, 2015

(65) Prior Publication Data

US 2016/0192351 A1 Jun. 30, 2016

Related U.S. Application Data

(60) Provisional application No. 62/096,967, filed on Dec. 26, 2014.

(51) Int. Cl.
*H04W 72/04* (2009.01)
*H04L 5/00* (2006.01)
*H04W 84/12* (2009.01)

(52) U.S. Cl.
CPC ....... *H04W 72/0413* (2013.01); *H04L 5/0007* (2013.01); *H04W 84/12* (2013.01)

(58) Field of Classification Search
CPC ......... H04W 72/0413; H04W 72/0453; H04W 72/048; H04W 72/04; H04W 72/0446;
(Continued)

(56) References Cited

U.S. PATENT DOCUMENTS

| 8,605,631 B2* | 12/2013 | Nakae | H04L 12/1868 370/278 |
| 2005/0099972 A1* | 5/2005 | Motegi | H04B 1/707 370/328 |

(Continued)

OTHER PUBLICATIONS

IEEE P802.11s™/D1.07 Draft Standard for Information technology—Telecommunications and information exchange between systems Local and metropolitan area networks—Specific requirements, Part 11: Wireless LAN Medium Access Contr (Year: 2007).*
(Continued)

*Primary Examiner* — Un C Cho
*Assistant Examiner* — Rasha K Fayed
(74) *Attorney, Agent, or Firm* — Morgan, Lewis & Bockius LLP

(57) ABSTRACT

In wireless communications, an access point may send a first frame to multiple stations. In one aspect, the first frame may include resource allocation information for uplink multi-user transmission. In response to the first frame, one or more stations may measure the channel characteristics associated with the first frame and send a second frame(s) for uplink multi-user transmission, where the second frame(s) includes resource preference information associated with the respective station(s). The access point may then generate and transmit a third frame based on the resource preference information. In another aspect, in response to the first frame, one or more stations may send a second frame(s) spanning the channel bandwidth supported by the respective station(s). The access point may measure the channel characteristics associated with the second frame and generate and transmit a third frame based on the measured channel characteristics. Other methods, apparatus, and computer-readable media are also disclosed.

18 Claims, 10 Drawing Sheets

(58) Field of Classification Search
CPC . H04W 72/08; H04W 72/0406; H04W 84/12; H04W 74/085; H04W 74/004; H04W 74/0808; H04W 74/0866; H04W 74/006; H04W 74/08; H04W 28/18; H04W 28/08; H04W 56/0005; H04W 88/10; H04L 5/0007; H04L 5/14; H04L 5/003; H04L 5/0091; H04L 5/143; H04L 1/0026; H04L 1/0003; H04L 1/0643; H04L 12/417; H04L 27/2647; H04L 25/0206; H04L 25/0232; H04L 25/0244
USPC ....... 370/329, 349, 448, 294, 276, 468, 330, 370/347, 445, 312, 328, 338, 436, 437, 370/465

See application file for complete search history.

(56) References Cited

U.S. PATENT DOCUMENTS

| | | | | |
|---|---|---|---|---|
| 2009/0086706 A1* | 4/2009 | Huang | .................. | H04L 1/0026 370/349 |
| 2010/0061326 A1* | 3/2010 | Lee | ................ | H04W 88/06 370/329 |
| 2010/0177670 A1* | 7/2010 | Hottinen | ................ | H04L 5/003 370/294 |
| 2012/0044900 A1* | 2/2012 | Morioka | .............. | H04B 7/0617 370/329 |
| 2012/0327915 A1* | 12/2012 | Kang | ................... | H04L 5/0007 370/336 |
| 2013/0336234 A1* | 12/2013 | Ghosh | .................. | H04W 72/10 370/329 |
| 2014/0098724 A1* | 4/2014 | Park | .................... | H04W 72/02 370/311 |
| 2014/0204891 A1* | 7/2014 | Park | .................... | H04W 56/00 370/329 |
| 2016/0345266 A1* | 11/2016 | Park | ................ | H04W 52/0235 |
| 2016/0353420 A1* | 12/2016 | You | ..................... | H04L 5/0053 |
| 2017/0208472 A1* | 7/2017 | Wentink | .................. | H04L 69/00 |

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

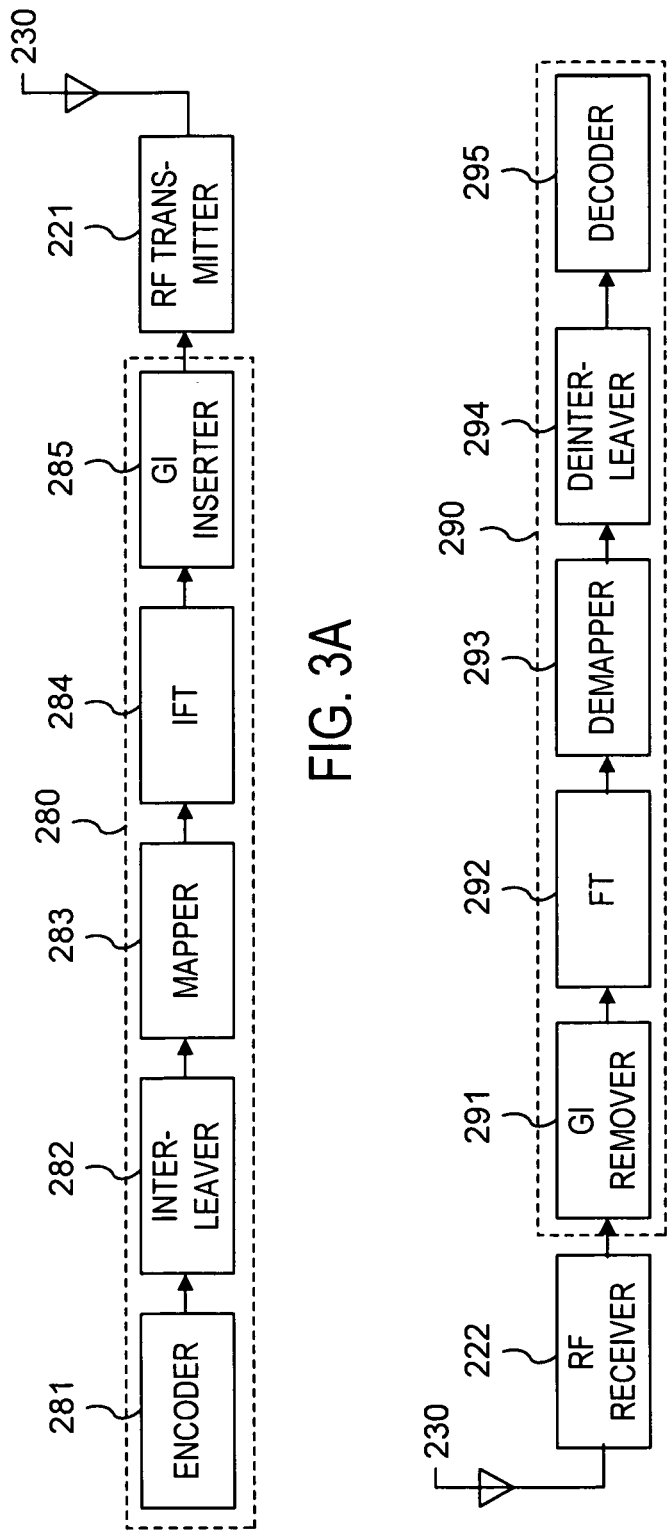
FIG. 3A
FIG. 3B
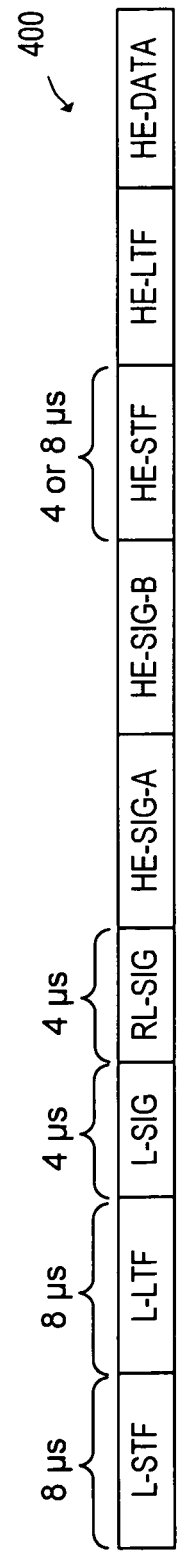
FIG. 4

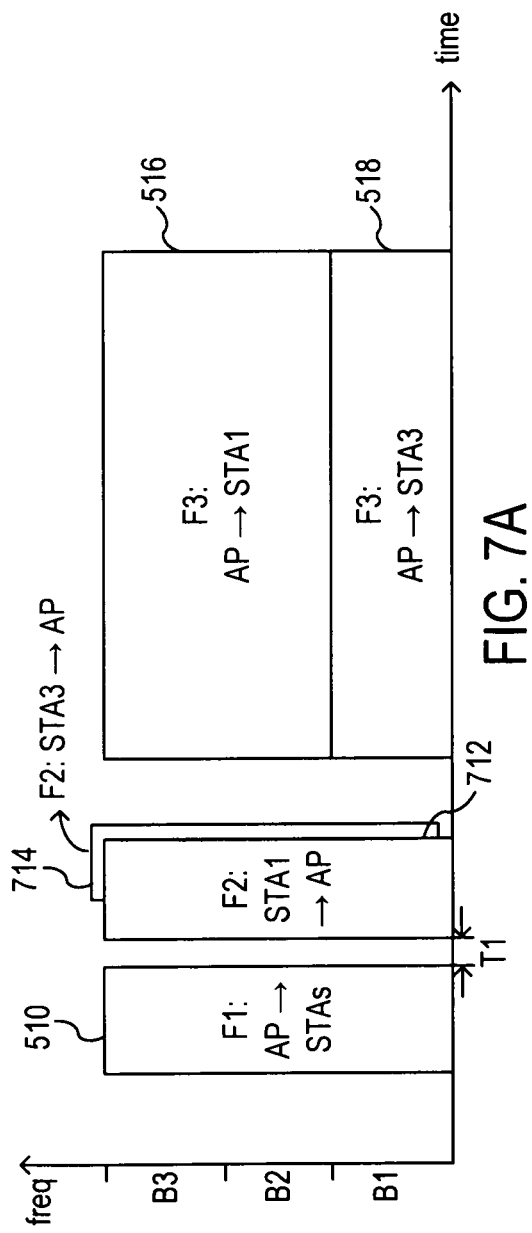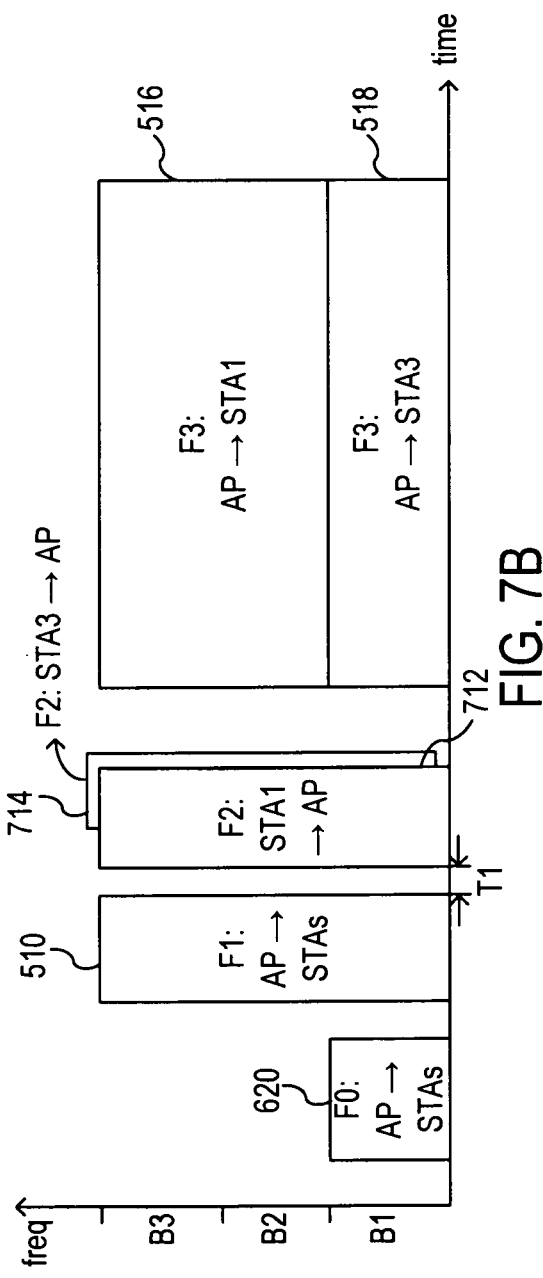

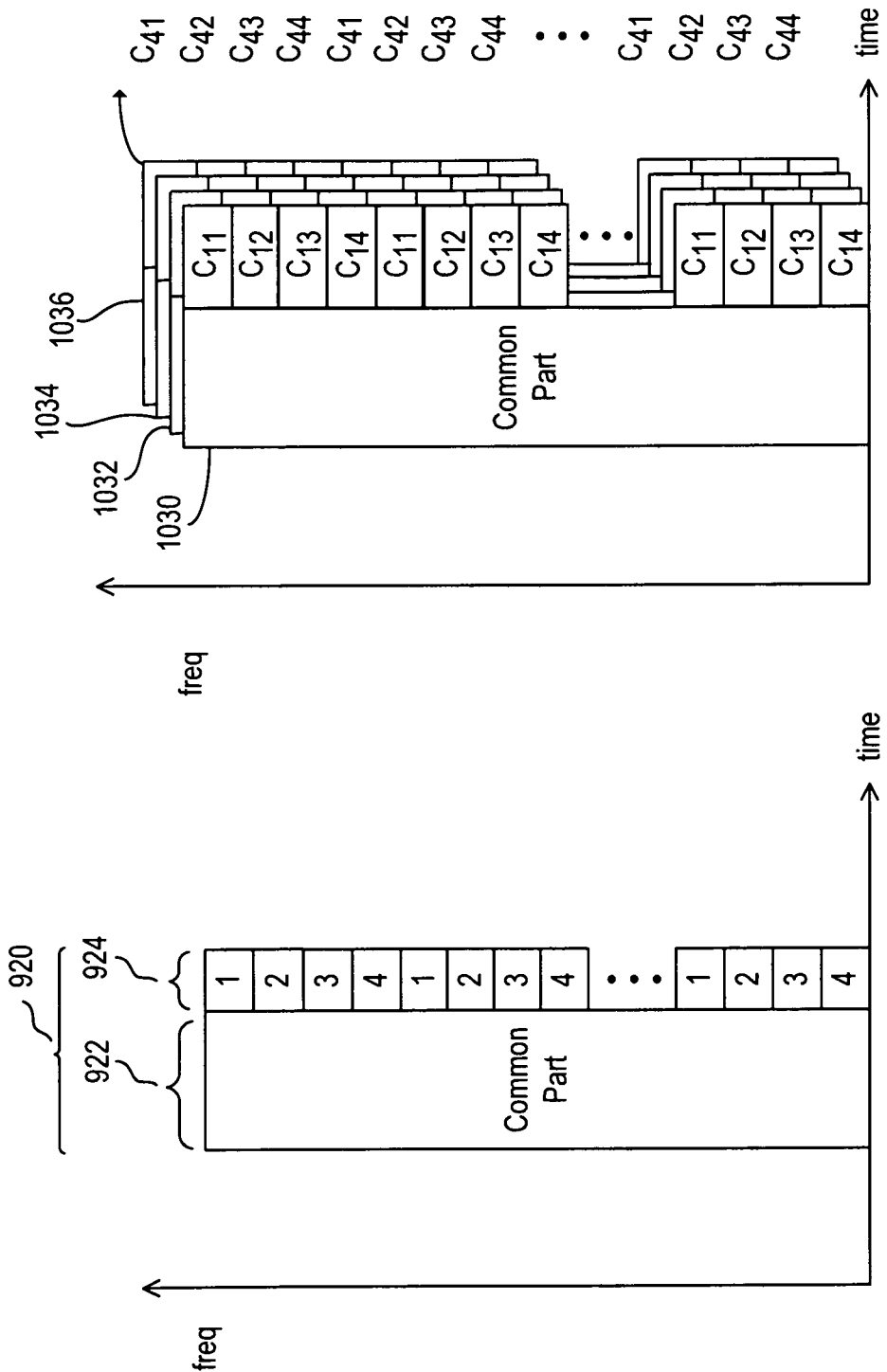

SYSTEMS AND METHODS FOR MULTI-USER TRANSMISSION

CROSS-REFERENCE TO RELATED APPLICATIONS

This application claims the benefit of priority from U.S. Provisional Application No. 62/096,967, entitled "SYSTEM AND METHOD FOR OFDMA TRANSMISSION," filed Dec. 26, 2014, which is incorporated herein by reference in its entirety.

TECHNICAL FIELD

The present description relates in general to wireless communication systems and methods, and more particularly to, for example, without limitation, systems and methods for multi-user transmission.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 3A illustrates a schematic block diagram of an example of a transmitting signal processor in a wireless communication device.

FIG. 3B illustrates a schematic block diagram of an example of a receiving signal processor in a wireless communication device.

FIG. 4 illustrates an example of a high efficiency (HE) frame.

FIG. 7A illustrates a schematic diagram of yet another example of an exchange of frames among wireless communication devices for multi-user transmission.

FIG. 7B illustrates a schematic diagram of yet another example of an exchange of frames among wireless communication devices for multi-user transmission.

FIG. 9 illustrates an example of an allocation of multiple stations in a reference frame transmission.

FIG. 10 illustrates an example of an allocation of multiple stations in a reference frame transmission.

Figure 1:
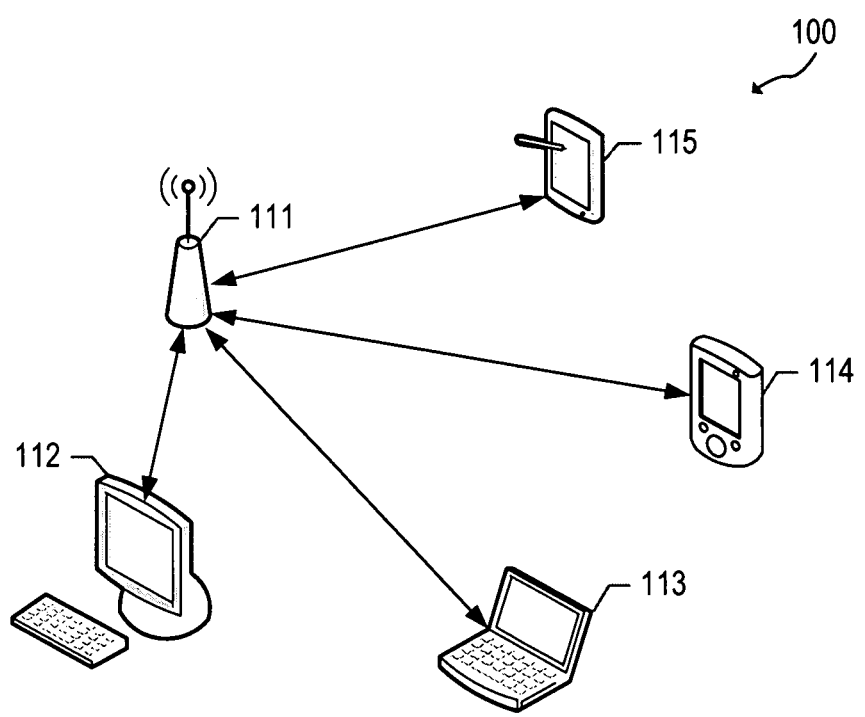
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

During the standardization activities of the Institute of Electrical and Electronics Engineers (IEEE) 802.11 Task Group ax, multi-user simultaneous transmission techniques such as Orthogonal Frequency Division Multiple Access (OFDMA) and Multi-User Multiple Input Multiple Output (MU-MIMO) are considered to improve network efficiency. In some cases, for the multi-user (MU) simultaneous transmission to exhibit performance gain, the MU simultaneous transmission should be operated in an organized manner, which may involve some additional information (e.g., additional signaling).

For example, an AP (e.g., a controlling AP associated with a group of stations) may need to know whether the stations associated with (e.g., having an established connection with) the AP are in an active state or are in a sleep state. In some aspects, when a station is in the active state, the station is ready to receive downlink frames from the AP. When a station is in the sleep state, the AP needs to buffer the station's downlink frames. As another example, the AP may need to know frequency selective channel status of the associated stations such that the AP can allocate channel resources for different stations in different frequency subchannels based on the frequency selective channel status in order to facilitate improved spectral efficiency for the stations. As another example, the AP may need to know multiple antenna channel statuses such that the AP can transmit downlink frames using multiple antennas in a spatially selective manner. As used herein, the term frequency subchannels may be used interchangeably with the terms subchannels, sub-bands, and frequency sub-bands.

In some cases, such as for downlink OFDMA transmission, the AP may need to know which station is in an active state and ready to receive downlink frames. For this purpose, the current IEEE 802.11 specification (e.g., IEEE 802.11 a, b, g, n, ac) defines the following procedure. The AP sends a management frame (e.g., a beacon frame) that includes a Traffic Indication Map (TIM) element. The TIM element indicates whether or not the AP has buffered frames for each of associated stations. The TIM element may include information coded in a partial virtual bitmap. If the AP indicates that the AP has buffered frames for a first station (STA) and if the first STA is ready to receive frames, the first STA sends a Power Save-Poll (PS-Poll) frame to the AP. After receiving the PS-Poll frame, the AP sends the buffered data frames to the first STA.

In some aspects, the current PS-Poll frame exchange process is not efficient, such as when utilized for downlink (DL) OFDMA. For example, the exchange process may involve transmission of multiple short frames (e.g., PS-Poll frame, acknowledgement (ACK) frame). Short frames may occupy a significant amount of wireless medium, which may be due in part to the carrier sense multiple access (CSMA) associated with the IEEE 802.11 protocol. As another example, since DL OFDMA transmission may involve the AP sending frames to multiple stations simultaneously, the AP may not initiate DL OFDMA transmission until the AP receives PS-Poll frames from the stations. However, because the AP cannot estimate when each station will send the PS-Poll frame, the AP may be unable to schedule DL OFDMA transmission with a reasonable transmission delay.

For an AP to schedule (e.g., allocate) each station at an appropriate frequency resource (e.g., frequency sub-band), the AP may determine and/or identify a frequency selective channel status associated with each station, which may involve additional overhead. The current IEEE 802.11 specification defines a channel sounding procedure. In some aspects, however, the currently defined channel sounding procedure is not adequate because it targets multiple antenna transmission (e.g., either single stream beamforming or spatial multiplexing), and it may involve more information than is needed for frequency selective channel scheduling. Another mechanism that can be used is for each station to measure a non-beamformed frame (e.g., beacon frame, other management frame) sent from the AP that the station is associated with and determine the station's frequency selective channel status based on the measurements. The station may inform the AP of the station's frequency selective channel status. However, in some aspects, beacon frames, or other management frames, are usually transmitted in a primary channel only. In these aspects, it may be difficult for the station to determine its frequency selective channel status for all the available channel bandwidth. For example, while the primary channel bandwidth may be 20 MHz, the total available channel bandwidth may be 80 MHz.

In one or more implementations, the subject technology provides systems and methods for MU transmission (e.g., OFDMA transmission, MU-MIMO transmission) to facilitate frequency selective channel scheduling. In some aspects, the subject technology allows additional information to be exchanged between a transmitter and a receiver. In some cases, the transmitter is an AP and the receiver is a station. In other cases, the transmitter is a station and the receiver is an AP.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
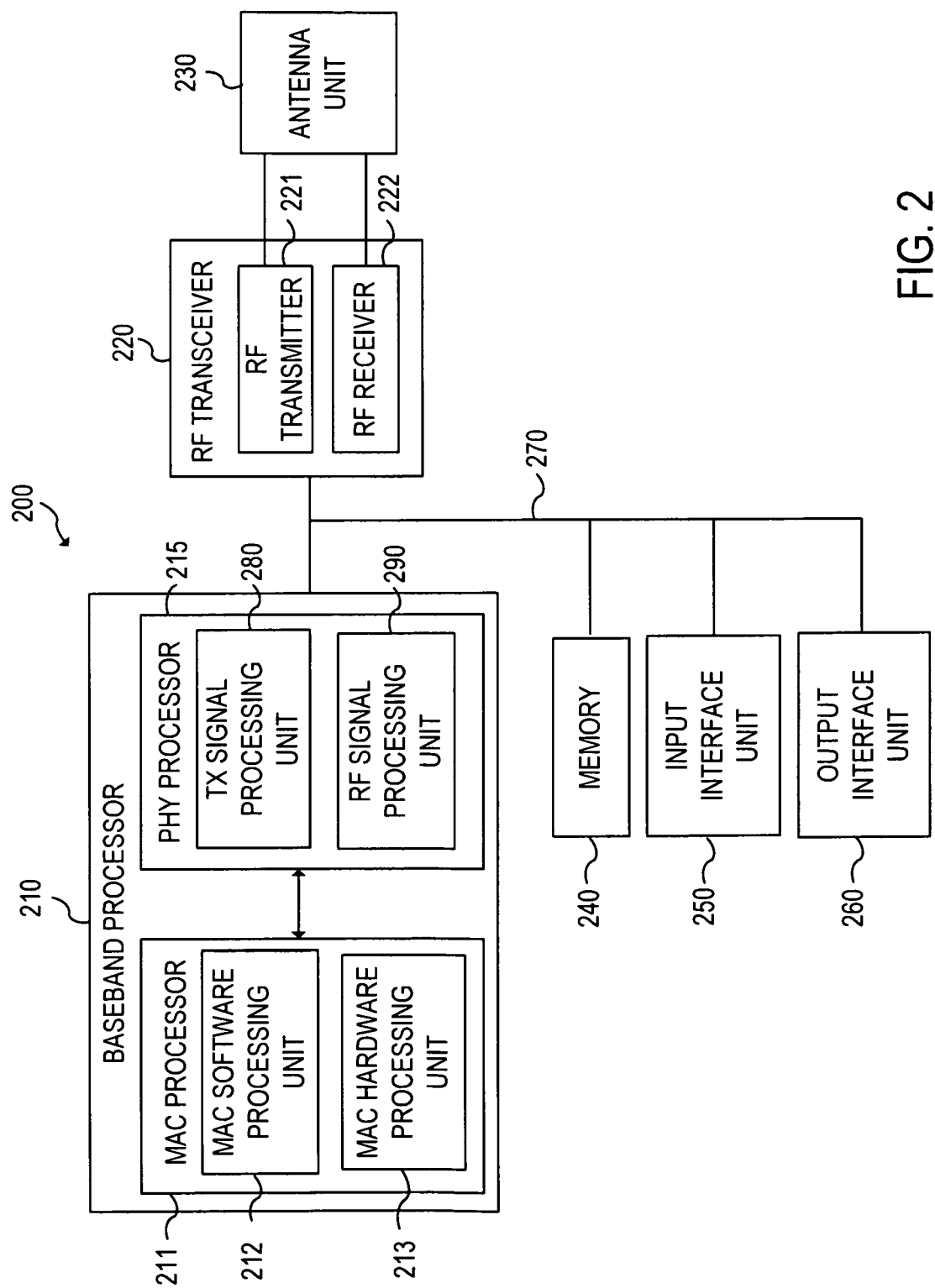
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

FIG. 4 illustrates an example of a high efficiency (HE) frame 400. The HE frame 400 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

Referring to FIG. 4, the HE frame 400 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 µs, 8 µs, and 4 respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz. Therefore, the legacy field (i.e., the STF, LTF, and SIG fields) occupies the entire channel bandwidth of the frame.

The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 400, which may be utilized by a receiver of the HE frame 400 to calculate a time duration of a transmission of the HE frame 400.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64. The HE-SIG-B field can be carried/modulated using an FFT size of e.g., 64 or 256 depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE frame 400 by a receiver, the size of (e.g., number of symbols contained in) the HE-SIG-B field may be indicated in the HE-SIG-A field. In some aspects, the HE header also includes a repeated L-SIG (RL-SIG) field, whose content is the same as the L-SIG field.

For a 20 MHz channel, an FFT size of 64 is associated with a discrete Fourier transform (DFT) period of 3.2 μs and a subcarrier spacing of 312.5 kHz. For a 20 MHz channel, an FFT size of 256 is associated with a DFT period of 12.8 μs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The DFT period may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. The HE-STF symbols may have a fixed pattern and a fixed duration. For example, the HE-STF symbols may have a predetermined repeating pattern. In one aspect, the HE-STF symbols do not require FFT processing. The HE frame 400 may include the data field, represented as HE-DATA, that contains data symbols. The data field may also be referred to as a payload field, data, payload or PSDU.

In one or more aspects, additional one or more of the HE-STF and/or HE-LTF fields may be included in the header. For example, an additional HE-STF field and/or an additional HE-LTF field may be included between the HE-SIG-A field and the HE-SIG-B field. The additional HE-STF and HE-LTF fields may be, for example, modulated/carried with FFT size of 64 on a 20 MHz channel and may be included as part of the first part of the HE frame 400. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Each of the fields (e.g., L-LTF, HE-SIG-B, etc.) of the HE frame 400 includes one or more guard intervals and one or more OFDM symbols. The guard interval may be utilized to facilitate compensation of multi-path effects, which may cause inter-symbol interference (ISI). In one or more implementations, a guard interval is a cyclic prefix (CP), and a guard interval duration is a CP length. In one or more aspects, the term duration may be referred to as a length. In one aspect, no guard interval is used for symbols in the L-STF field and/or HE-STF field. Each guard interval may be associated with a symbol and may be present between symbols (or between consecutive symbols). In some aspects, each OFDM symbol is preceded (or followed) by a guard interval. In some aspects, the OFDM symbol may be referred to as including the guard interval that precedes (or follows) the OFDM symbol.

In one or more implementations of a transmitter, a GI inserter 285 illustrated in FIG. 3A may prepend a guard interval to an OFDM symbol. For a receiver, a GI remover 291 of FIG. 3B may remove the prepended guard interval.

In one or more implementations, a method of sending data frames from an AP to one or more STAs in OFDMA in a wireless communication system is provided. The method may include: sending a first frame from the AP, where the first frame includes scheduling information of a second frame transmission from one or more stations; receiving the second frame at the AP, where one or more stations indicated in the first frame send the second frame in an OFDMA manner and each such second frame includes preferred frequency sub-band information of the respective station; scheduling data frame transmission at the AP in an OFDMA manner based on the preferred frequency sub-band information included in each such second frame; and sending data frames from the AP to one or more stations in an OFDMA manner as scheduled (i.e., in a third frame or any number of subsequent frames).

In one or more implementations, systems and methods for MU transmission (e.g., OFDMA transmission and MU-MIMO transmission) are provided to facilitate frequency selective channel scheduling. The systems and methods may help avoid or reduce additional overhead that may be associated with frequency selective channel scheduling. Each station's preferred band of the frequency selective channel may be provided to and/or determined by an AP serving the station before the AP sends downlink frames as part of OFDMA transmission. In a first approach, each station may measure a reference signal (e.g., a downlink frame) sent by the serving AP and may then send the station's preferred frequency sub-band information as part of OFDMA transmission. Examples of this approach are illustrated with respect to FIGS. 5 and 6. In a second approach, the AP may determine each station's preferred frequency sub-band(s) by measuring a received frame from the station. Examples of this second approach are illustrated with respect to FIGS. 7A through 7C and 8 through 11.

Figure 5:
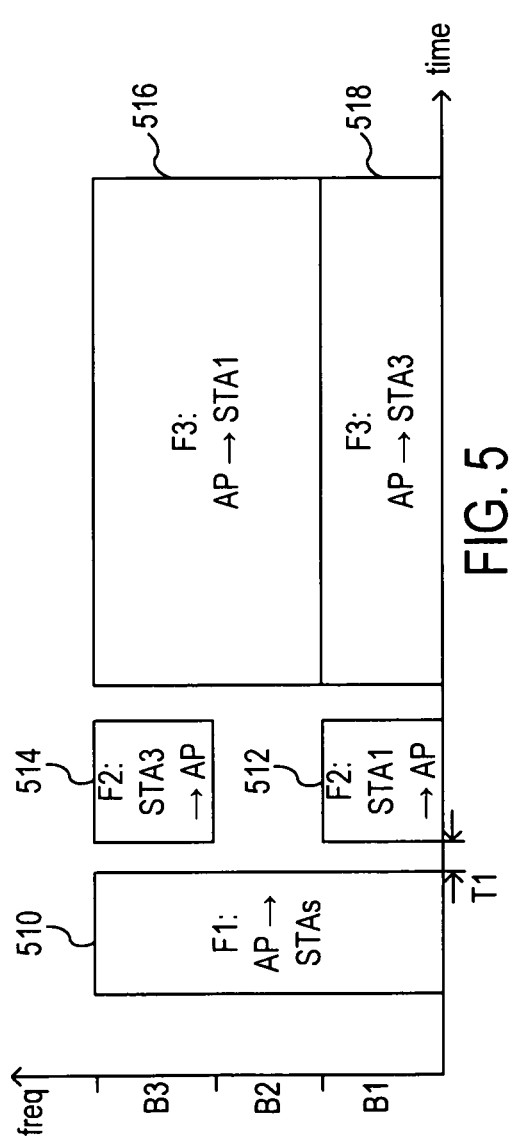
FIG. 5 illustrates a schematic diagram of an example of an exchange of frames among wireless communication devices for multi-user transmission.

FIG. 5 illustrates a schematic diagram of an example of an exchange of frames among wireless communication devices for multi-user transmission. The wireless communication devices include an AP, a participating STA1, a participating STA2, and a participating STA3. Although FIG. 5 illustrates an exchange of frames between an AP and three stations participating in OFDMA transmission, the exchange of frames may be between the AP and fewer than or greater than three stations, including the exchange of frames between the AP and one participating station (e.g., the non-OFDMA case).

An AP sends a downlink frame 510, denoted as F1, to a group of participating stations (e.g., STA1, STA2, and STA3). The downlink frame 510 may occupy the entire channel bandwidth over which DL OFDMA transmission occurs. In FIG. 5, the entire channel bandwidth over which DL OFDMA occurs includes the frequency sub-bands B1, B2, and B3. However, additional, fewer, and/or different frequency sub-bands may be utilized by an AP.

The downlink frame 510 may provide, for example, a transmission opportunity to the participating stations and may indicate resource allocation information for the participating stations pertaining to OFDMA transmission. For example, the downlink frame 510 may include an indication for the participating stations to send resource preference information to the AP. The resource allocation information may include a sub-band (or a frequency subchannel) assigned to each respective one of the participating stations. For instance, when there are three STAs, and the uplink channel bandwidth is, for example, 80 MHz, then the AP may assign a sub-band of the uplink channel bandwidth (e.g., a portion of 80 MHz) to each respective STA so that each STA has its assigned sub-band. In one or more aspects, the resource allocation information may also include scheduling information regarding when a respective one of the participating stations may transmit using its assigned sub-band, and/or may include the number of spatial streams that the STAs may use.

In some aspects, the downlink frame 510 may be, or may be referred to as, a trigger frame. In some aspects, the downlink frame 510 allows allocation of the frequency resource to be utilized by the participating STAs in their report frame transmission that follows the downlink frame 510. In one or more aspects, there is no intervening frame between the downlink frame and the report frame. The frequency resource allocation information may be in the HE-SIG-B field of the downlink frame 510. In FIG. 5, the AP allocates STA1's report frame transmission at frequency sub-band B1, STA2's report frame transmission at frequency sub-band B2, and STA3's report frame transmission at frequency sub-band B3.

When the participating stations receive the downlink frame 510 sent by the AP, the participating stations may decode the downlink frame 510 and identify the frequency sub-bands allocated to the participating stations. The participating stations may transmit report frames, each denoted as F2, as part of UL OFDMA transmission to the AP. In the example illustrated in FIG. 5, STA1 and STA3 successfully receive the downlink frame 510 whereas STA2 does not successfully receive the downlink frame 510. Therefore, whereas STA1 transmits a report frame 512 in its allocated sub-band B1 and STA3 transmits a report frame 514 in its allocated sub-band B3, STA2 does not transmit a report frame. In some aspects, the report frames are transmitted at a predetermined time T1 after receiving the downlink frame 510. In some aspects, the report frame transmission directly follows the downlink frame 510 such that no other frames (e.g., UL frames or DL frames) are sent between the downlink frame 510 and the report frames 512 and 514. For example, in these aspects, no data communication (sending or receiving) occurs in the channel between the AP and any one of the STAs (e.g., STA1, STA2, STA3) between the downlink frame 510 and the report frames 512 and 514.

In one or more implementations, each of STA1 and STA3 may transmit a PPDU that includes a payload (e.g., the frame 512 or 514, respectively) and a header. A payload may represent a PSDU that occupies its assigned frequency sub-band (e.g., B1 or B3 for the frame 512 or 514, respectively). In other words, each of the frames 512 and 514 may be a PSDU (or an HE-DATA field of the frame 400) occupying the assigned frequency sub-band. A header (or at least a portion of the header) may occupy the entire channel bandwidth supported by the UL OFDMA transmission (or the UL MU transmission). The header may include a legacy header. In some examples, the header may include a legacy header and some or all fields of a non-legacy header (e.g., an HE header). After the stations transmit their respective PPDUs, the PPDUs are combined (or aggregated) to form a single combined frame, which is received by the AP. A single combined frame may be sometimes referred to as a combined UL frame, a final UL frame, an MU frame, a UL MU frame or a UL OFDMA frame.

For each participating station's report frame transmission, the participating station may measure the signal strength/quality associated with the received downlink frame 510. For example, signal strength/quality may be measured using metrics such as a received signal strength indicator (RSSI) and a signal-to-noise ratio (SNR), among others. The participating station may determine its preferred frequency band(s) based on the measured signal strength/quality. The participating station may include information associated with its preferred frequency band(s) in its report frame (e.g., 512, 514). Each participating station's report frame occupies the frequency sub-band indicated in the downlink frame 510. For example, in their respective report frames (e.g., 512, 514), STA1 may indicate that frequency sub-bands B2 and B3 are its preferred frequency sub-bands, and STA3 may indicate that frequency sub-band B1 is its preferred frequency sub-band.

In some aspects, a report frame may include a Frame Control field, Preferred Bandwidth field, Receiver Address (RA) field, Transmitter Address (TA) field, Association Identifier (AID) field, and/or Frame Check Sequence (FCS) field. In one aspect, the Type of the report frame is Control frame, and the Subtype of the report frame is PS-Poll frame. The Preferred Bandwidth field may include the preferred frequency sub-band(s) of the station generating the report frame. The RA field may include the address of the AP, which is the intended recipient of the report frame. The TA field may include the address of the station transmitting the report frame. The AID field may include a value assigned to the station transmitting the report frame by the AP.

In this regard, the report frame may be a modified version of a PS-Poll frame, and the report frame transmission may be referred to as a PS-Poll frame transmission. In some aspects, the report frame does not include an identifier associated with the station that sent the report frame. In some aspects, a report frame does not include a TA field, an RA field or an AID field. In some aspects, a report frame includes the TA field, RA field and AID field, but repurposes these fields such that they are utilized to deliver the preferred frequency sub-band(s) information. For example, the TA field, RA field and AID field may be repurposed into the Preferred Bandwidth field. The AP may determine which stations sent which report frames based on the resource allocation (e.g., frequency sub-band allocation) provided to the stations in the downlink frame 510 immediately preceding the report frames.

After receiving the report frames 512 and 514 from STA1 and STA3, the AP sends a DL OFDMA frame, including downlink frames 516 and 518, each denoted as F3, as part of OFDMA transmission to STA1 and STA3, respectively. The DL OFDMA frame may include resource allocation information, such as frequency sub-band allocation information, for STA1 and resource allocation information, such as frequency allocation information, for STA3.

STA1 and STA3 may receive the DL OFDMA frame (including the downlink frames 516 and 518) and extract their respective resource allocation information. STA1 and STA3 may then decode the downlink frames 516 and 518, respectively, based on the resource allocation information. The frequency resource allocation information may be in the HE-SIG-B field of the DL OFDMA frame. This can allow the HE-SIG-B field to be shared by the downlink frames 516 and 518. In other words, in one or more examples, there is only one HE-SIG-B field that includes the resource allocation information of both STA1 and STA3.

The AP may determine the resource allocation for each of STA1 and STA3 based on the report frames 512 and 514 (e.g., the preferred sub-band(s) included in the report frames), although, in some aspects, the AP can determine the resource allocation at its sole discretion and does not need to take into consideration the report frames. In a case that multiple stations indicate a preference for the same frequency sub-bands, the AP may determine the resource allocation, at its discretion, based on other factors such as the amount of buffered traffic for the stations, the previous history of received signal strength/quality at the various frequency sub-bands for the stations, random allocation by the AP, etc.

In some aspects, the AP may transmit the downlink frames 516 and 518 as part of OFDMA transmission in accordance with the resource allocation to STA1 and STA3. For example, the AP may allocate frequency sub-bands B2 and B3 to STA1 and may transmit the downlink frame 516 to STA1 using the frequency sub-bands B2 and B3. Similarly, the AP may allocate frequency sub-band B1 to STA3 and may transmit the downlink frame 518 to STA3 using the frequency sub-band B1. In some aspects, the AP does not schedule downlink frame transmission for those stations (e.g., STA2) that have not sent a report frame to the AP, even in the case that the AP has buffered data frames for these stations.

In one or more examples, the AP can send a single DL OFDMA PPDU that includes a header and a payload. The payload may include PSDUs such as the downlink frames 516 and 518. The header may have, among others, one HE-SIG-B field that can provide the frequency resource allocation information for both STA1 and STA3. When STA1 and STA3 receive the DL OFDMA PPDU from the AP, STA1 and STA3 may extract their respective resource allocation information from the DL OFDMA PPDU (e.g., the HE-SIG-B field of the DL OFDMA PPDU) and decode the DL OFDMA PPDU based on the respective resource allocation information. For example, the downlink frame 516 represents a PSDU of the DL OFDMA PPDU and occupies the sub-bands B2 and B3, and the downlink frame 518 represents a PSDU of the DL OFDMA PPDU and occupies the sub-band B1. Based on the resource allocation information, STA1 decodes the downlink frame 516, which is the portion of the DL OFDMA PPDU that occupies the sub-bands B2 and B3, whereas STA3 decodes the downlink frame 518, which is the portion of the DL OFDMA PPDU that occupies the sub-band B1. In one or more aspects, the DL OFDMA PPDU may be referred to as a DL MU PPDU or a DL MU frame.

In one or more implementations, the frames 512, 514, 516 and 518 illustrated in FIG. 5 may represent PSDUs (or payloads) that occupy the assigned frequency sub-bands (e.g., B1, B2 and/or B3). In other words, each of the frames 512, 514, 516 and 518 may be a PSDU (or an HE-DATA field of the frame 400) occupying the assigned frequency sub-band. In some aspects, the legacy header and the HE header (if any) of the frames 512, 514, 516 and 518, which occupy the entire channel bandwidth over which DL or UL OFDMA transmission occurs, are not illustrated in FIG. 5 for simplicity. In some aspects, the frames 512 and 514 are PSDUs that are part of UL MU PPDUs. In some aspects, the frames 516 and 518 are PSDUs (or payloads) of a single DL OFDMA PPDU.

Figure 6:
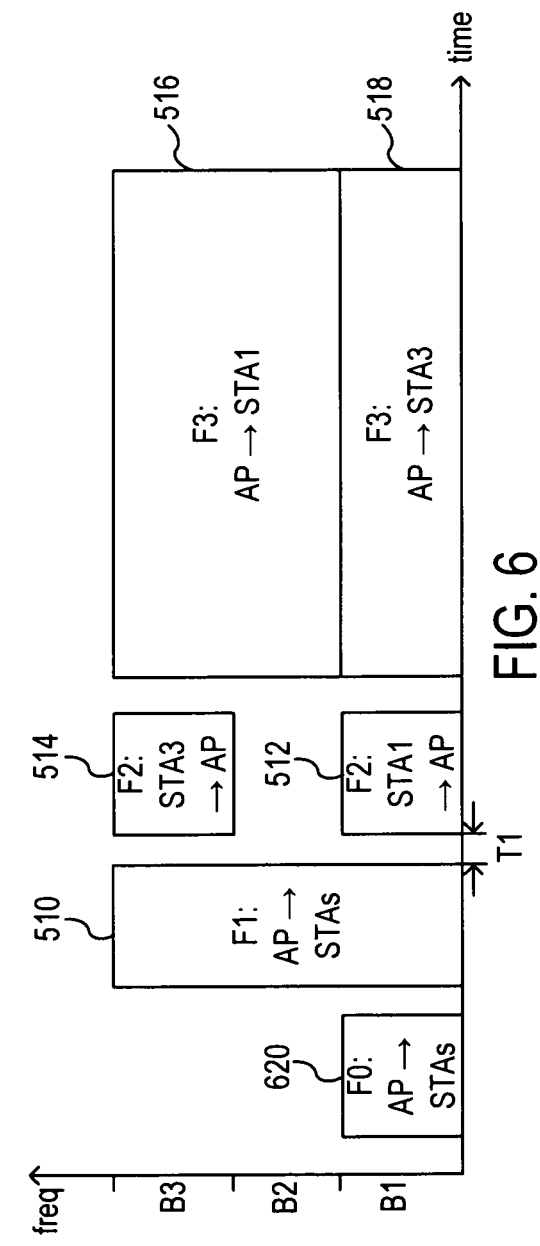
FIG. 6 illustrates a schematic diagram of another example of an exchange of frames among wireless communication devices for multi-user transmission.

FIG. 6 illustrates a schematic diagram of another example of an exchange of frames among wireless communication devices for multi-user transmission. The description from FIG. 5 generally applies to FIG. 6, with examples of differences between FIG. 5 and FIG. 6 and other description provided herein for purposes of clarity and simplicity.

In FIG. 6, the AP sends a downlink frame 620, denoted as F0. The downlink frame 620 may include information on the stations for which traffic is pending and/or buffered in the AP, and the information may be coded in a partial virtual bitmap (e.g., TIM element), such as that defined in the IEEE 802.11 specification. The downlink frame 620 may be broadcast to stations associated with (e.g., having an established connection with) the AP. For example, the downlink frame 620 may be, may include, or may be part of, a beacon frame that periodically (e.g., every 100 milliseconds) broadcasts information associated with data traffic that is pending and/or buffered in the AP to the stations associated with the AP. In some aspects, the downlink frame 620 does not occupy the entire channel bandwidth supported by the AP. In the example shown in FIG. 6, the downlink frame 620 only occupies the frequency sub-band B1. For example, the downlink frame 620 may be transmitting on a 20 MHz sub-band, whereas the entire channel bandwidth may be 80 MHz.

After sending the downlink frame 620, the AP sends the downlink frame 510 to a group of participating stations (e.g., STA1, STA2, and STA3). The downlink frame 510 may indicate, for example, resource allocation information for the stations. In FIG. 6, the AP allocates STA1's report frame transmission at frequency sub-band B1, STA2's report frame transmission at frequency sub-band B2, and STA3's report frame transmission at frequency sub-band B3. In some aspects, the downlink frame 510 may be sent to the group of stations for which traffic is pending and/or buffered in the AP, as indicated by the downlink frame 620. In some aspects, the downlink frame 510 may include resource allocation (e.g., frequency allocation) only for the group of stations for which traffic is pending and/or buffered in the AP. In other words, in some aspects, the stations that are scheduled in the downlink frame 510 are limited to those stations for which traffic is pending and/or buffered in the AP, which is indicated in the downlink frame 620. The downlink frame 510 may occupy the entire channel bandwidth over which DL OFDMA transmission occurs. In some aspects, the scheduled resource (e.g., allocated frequency sub-band) for each station is not explicitly included in the downlink frame 510, but rather is predetermined based on the information in the downlink frame 620.

When the participating stations receive the downlink frame 510 sent by the AP, the participating stations may decode the downlink frame 510 and identify in which frequency sub-bands the participating stations are scheduled to transmit. The scheduled participating stations may transmit a report frame in their allocated frequency sub-bands as part of UL OFDMA to the AP. In the example illustrated in FIG. 6, STA1 and STA3 successfully receive the downlink frame 510 whereas STA2 does not successfully receive the downlink frame 510. Therefore, whereas STA1 sends the report frame 512 in its allocated sub-band B1 and STA3 sends a report frame 514 in its allocated sub-band B3, STA2 does not send a report frame. In some aspects, the report frames are transmitted at a predetermined time T1 after receiving the downlink frame 510. After receiving the report frames from STA1 and STA3, the AP sends the downlink frames 516 and 518 as part of OFDMA transmission to STA1 and STA3, respectively. The downlink frames 516 and 518 may include resource allocation information, such as frequency sub-band allocation information, for STA1 and STA3, respectively. In some aspects, the AP does not schedule downlink frame transmission for those stations (e.g., STA2) that have not sent a report frame to the AP, even in the case that the AP has buffered data frames for these stations.

FIG. 7A illustrates a schematic diagram of another example of an exchange of frames among wireless communication devices for multi-user transmission. The description from FIG. 5 generally applies to FIG. 7A, with examples of differences between FIG. 5 and FIG. 7A and other description provided herein for purposes of clarity and simplicity.

In FIG. 7A, the AP sends the downlink frame 510 to a group of participating stations (e.g., STA1, STA2, and STA3). The downlink frame 510 may indicate, for example, resource allocation information for the stations. When the participating stations receive the downlink frame 510 sent by the AP, each scheduled participating STA may send a reference frame, denoted as F2, to the AP. STA1 may send the reference frame 712. STA3 may send the reference frame 714. Each of the references frames 712 and 714 may be sent simultaneously occupying the entire channel bandwidth that the corresponding station (i.e., STA1 or STA3, respectively) supports within the channel bandwidth occupied by the downlink frame 510, in a predetermined manner at a predetermined time T1 after receiving the trigger frame such that the reference frames 712 and 714 from different STAs can be identified from the AP. In one aspect, each reference frame occupies at least part of the entire channel bandwidth that the corresponding STA supports. The predetermined manner may include, for example, code division multiplexing (CDM) and/or frequency division multiplexing (FDM) to be utilized by the stations for transmitting the reference frames to the AP. The predetermined manner is known to the AP. In the example illustrated in FIG. 7A, STA1 and STA3 successfully receive the downlink frame 510 whereas STA2 does not successfully receive the downlink frame 510. Therefore, whereas STA1 sends the reference frame 712 and STA3 sends the reference frame 714, STA2 does not send a reference frame. The reference frames 712 and 714 may be PS-Poll frames or modified PS-Poll frames. In some aspects, the reference frames 712 and 714 may be null data packet (NDP) frames (e.g., contain no HE-DATA field).

Figure 8:
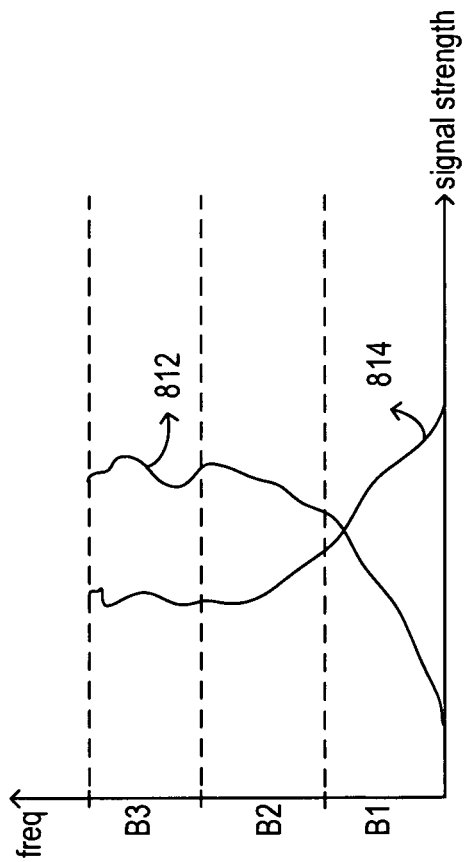
FIG. 8 illustrates an example of signal strength of received frames.

When the AP receives the reference frames 712 and 714, the AP may measure channel characteristics (e.g., channel gain, signal strength/quality) of STA1 and STA3 based on the reference frames 712 and 714, respectively. FIG. 8 illustrates an example of signal strength of the received reference frames 712 and 714 at the AP side. In this regard, curves 812 and 814 in FIG. 8 represent the signal strength of the received reference frames 712 and 714, respectively, at the AP side. As shown in FIG. 8, the reference frame 712 from STA1 is received at the AP with a higher signal strength than the reference frame 714 from STA3 at frequency sub-bands B2 and B3, and the reference frame 714 from STA3 is received at the AP with a generally higher signal strength than the reference frame 712 from STA1 at frequency sub-band B1.

Based on the measured channel characteristics, the AP may determine frequency allocation for STA1 and STA3. The AP sends the downlink frames 516 and 518 as part of OFDMA transmission. Based on the example shown in FIG. 8, the AP may allocate frequency sub-band B2 and B3 to STA1 and frequency sub-band B1 to STA3 for downlink frame transmission.

In some implementations, the AP may measure channel characteristics over a full-band (e.g., a full-band of an uplink multi-user transmission or a full-band of the downlink frame 510) or a portion (e.g., a set of sub-bands) of a full-band. In one aspect, the full-band of the downlink frame 510 includes the entire channel bandwidth occupied by the downlink frame 510. In some implementations, the AP may measure channel characteristics over the maximum bandwidth, within the full-band of the downlink frame 510, that is supported by the participating stations (e.g., STA1 and STA3), or a portion (e.g., a set of sub-bands) of the maximum bandwidth. For example, the measured channel characteristics may include signal strength or quality associated with a set of sub-bands of (1) the full-band of the downlink frame 510 or (2) the respective maximum bandwidth, of each participating station (e.g., STA1 and STA3), within the full-band of the downlink frame 510. In some cases, the set of sub-bands may be, or may include, a subset of the sub-bands that are occupied by the downlink frame 510.

FIG. 7B illustrates a schematic diagram of another example of an exchange of frames among wireless communication devices for multi-user transmission. The description from FIG. 7A generally applies to FIG. 7B, with examples of differences between FIG. 7A and FIG. 7B and other description provided herein for purposes of clarity and simplicity. In some aspects, the downlink frame 510 follows a downlink frame 620. The AP may send the downlink frame 620 in a broadcasting manner prior to sending the downlink frame 510, wherein the downlink frame 620 includes first information on the STAs for which traffic is pending and buffered in the AP. In one aspect, the downlink frame 620 is a beacon frame. In one aspect, the downlink frame 620 is sent occupying not all the bandwidth that the AP supports. In one aspect, the first information on the STAs for which traffic is pending and buffered in the AP, included in the downlink frame 620, is coded in a partial virtual bitmap, which is defined in IEEE 802.11 specification. For example, the downlink frame 620 may include a TIM element. In one aspect, the STAs that are scheduled in the downlink frame 510 is limited to those STAs for which traffic is pending and buffered in the AP, which is indicated by the downlink frame 620. In one aspect, the scheduled resource for each STA is not explicitly included in the downlink frame 510 but is predetermined based on the first information in the downlink frame 620.

Figure 7C:
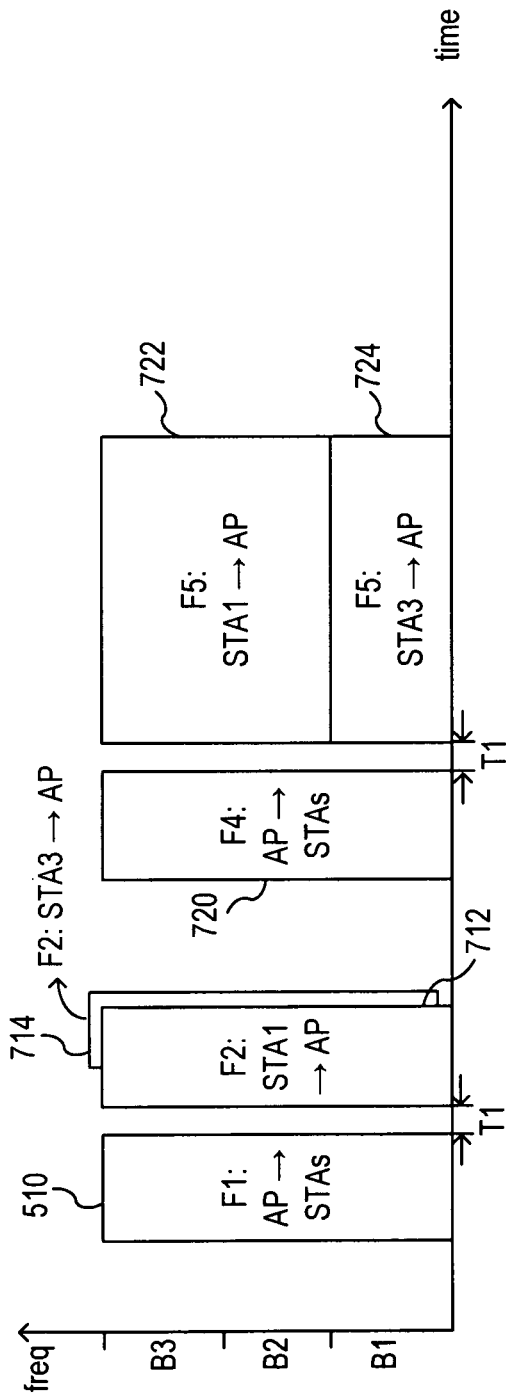
FIG. 7C illustrates a schematic diagram of yet another example of an exchange of frames among wireless communication devices for multi-user transmission.

FIG. 7C illustrates a schematic diagram of another example of an exchange of frames among wireless communication devices for multi-user transmission. The description from FIG. 7A generally applies to FIG. 7C, with examples of differences between FIG. 7A and FIG. 7C and other description provided herein for purposes of clarity and simplicity.

In some aspects, after receiving the reference frames 712 and 714, the AP sends a downlink frame 720, denoted as F4, to STA1 and STA3. The downlink frame 720 may occupy the entire channel bandwidth over which DL OFDMA transmission occurs. The downlink frame 720 includes frequency resource allocation to be utilized by STA1 and STA3 in UL OFDMA transmission. The frequency resource allocation may be based on measurements (e.g., signal strength measurements) of the reference frames 712 and 714 by the AP. In some aspects, the downlink frames 510 and/or 720 may each be, or may each be referred to as, a trigger frame.

After the participating stations STA1 and STA3 receive the downlink frame 720 sent by the AP, the participating stations may decode the downlink frame 720, identify the frequency sub-bands allocated to the participating stations, and transmit uplink frames, each denoted as F5, as part of UL OFDMA transmission to the AP. As an example, in FIG. 7C, the AP allocates sub-bands B2 and B3 to STA1 and sub-band B1 to STA3. In such a case, STA1 transmits an uplink frame 722 in its allocated sub-bands B2 and B3 and STA3 transmits an uplink frame 724 in its allocated sub-band B1. In some aspects, the uplink frames 722 and 724 are transmitted at a predetermined time T1 after receiving the downlink frame 720. In some aspects, the uplink frames 722 and 724 directly follow the downlink frame 720 such that no other frames (e.g., UL frames or DL frames) are sent between the downlink frame 720 and the uplink frames 722 and 724. For example, in these aspects, no data communication occurs in the channel between the AP and any one of the STAs (e.g., STA1, STA2, STA3) between the downlink frame 720 and the uplink frames 722 and 724.

In one or more implementations, each of STA1 and STA3 may transmit a PPDU that includes a payload (e.g., the frame 722 or 724, respectively) and a header. A payload may represent a PSDU that occupies its assigned frequency sub-band (e.g., B2 and B3 for the frame 722, B1 for the frame 724). In other words, each of the uplink frames 722 and 724 may be a PSDU (or an HE-DATA field of the frame 400) occupying the assigned frequency sub-band. A header (or at least a portion of the header) may occupy the entire channel bandwidth supported by the UL OFDMA transmission (or the UL MU transmission). The header may include a legacy header. In some examples, the header may include a legacy header and some or all fields of a non-legacy header (e.g., an HE header). After the stations transmit their respective PPDUs, the PPDUs are combined (or aggregated) to form a single combined frame, which is received by the AP. A single combined frame may be sometimes referred to as a combined UL frame, a final UL frame, an MU frame, a UL MU frame or a UL OFDMA frame.

While not shown in FIG. 7C, it should be noted that in some examples, the downlink frame 510 may follow another downlink frame (e.g., a beacon frame).

Multiple ways may be utilized to send the reference frame from one or more stations simultaneously. In one example, FDM may be utilized in which different stations may be allocated in different non-overlapping frequency tones such that the allocation of the stations can span the entire channel bandwidth. The AP may distinguish between reference frames from different stations based on the frequency tones utilized for the reference frames. A frequency tone may also be referred to as a tone, a frequency subcarrier, or a subcarrier. In another example, CDM may be utilized.

FIG. 9 illustrates an example of an allocation of multiple stations in a reference frame transmission, in which FDM is utilized. An entire reference frame 920 (e.g., a PPDU) may be composed of two parts. A first part 922 of the reference frame 920 may be a common part for which every participating station sends the same information. The first part 922 may occupy the entire channel bandwidth over which UL OFDMA transmission occurs. The first part 922 may include the legacy header (e.g., L-STF, L-LTF, and L-SIG fields). In some aspects, the first part 922 may also include the RL-SIG field, HE-SIG-A field, and/or HE-STF field. A second part 924 of the reference frame 920 may be an individual part from which every participating station's signal can be separately identified. The second part 924 may include the HE-LTF field. In the example shown in FIG. 9, every station (e.g., STA1, STA2, STA3, STA4) sends one frequency subcarrier in every four consecutive frequency subcarriers. Each frequency subcarrier is represented as a box in FIG. 9. The number shown in each box of the second part 924 indicates the STA to which the frequency subcarrier is allocated. For example, a box with the number 1 in it represents a frequency subcarrier allocated to STA1. In some aspects, the reference frame 920 may be an NDP frame (e.g., contains no HE-DATA field).

FIG. 10 illustrates an example of an allocation of multiple stations in a reference frame transmission, in which CDM is utilized. STA1 may send a reference frame 1030, STA2 may send a reference frame 1032, STA3 may send a reference frame 1034, and STA4 may send a reference frame 1036. Each of the common parts of the reference frames 1030, 1032, 1034, and 1036 includes the legacy header (e.g., L-STF, L-LTF, and L-SIG fields). The reference frames 1030, 1032, 1034, and 1036 each include a respective station-specific part. In some aspects, the reference frames 1030, 1032, 1034, and 1036 may be PS-Poll frames or modified PS-Poll frames. In some aspects, the reference frames 1030, 1032, 1034, and 1036 may be NDP frames (e.g., contain no HE-DATA field). Orthogonal code (e.g., of size 4 in FIG. 10) may be used to distinguish between signals sent by different stations. In some aspects, each station's transmission resource, including which code word being utilized at which tone, is predetermined (e.g., known to the station and to the AP). The code may be referred to as a spreading code. The transmission resource may include an orthogonal signature or a quasi-orthogonal signature allocated to the each station by the AP. The signature may be delivered in an HE frame (e.g., 400), such as in the HE-LTF field of the HE frame.

In some aspects, the HE frame that includes the signature does not have a payload (e.g., HE-DATA field). Based on the signatures at each frequency sub-band, the AP may determine which station sent the reference frame and may measure a channel gain of the channel bandwidth associated with the station. In such aspects, when the references frames 1030, 1032, 1034, and 1036 are PS-Poll frames or modified PS-Poll frames, information associated with the TA, RA, and AID fields is not needed for PS-Poll transmission. In one aspect, the PS-Poll transmission utilizes only one piece of information to indicate to the AP whether the station sending the reference frame is ready to receive. In such an aspect, the piece of information may be the signature. For example, if a station sends its signature, the station is ready to receive. If the station does not send its signature, the station is not ready to receive. In some aspects, other information, such as the TA, RA, and AID, are not needed for indicating whether the station is ready or not ready to receive.

As examples, in FIG. 10, $C_{12}$ denotes a second code element sent by STA1 and $C_{43}$ denotes a third code element sent by STA4. Hence, the first index indicates the station, and the second index indicates the code element. In FIG. 10, for every four consecutive frequency tones, an $i^{th}$ STA sends a code word ($C_{i1}$, $C_{i2}$, $C_{i3}$, $C_{i4}$) in parallel, where ($C_{i1}$, $C_{i2}$, $C_{i3}$, $C_{i4}$) and ($C_{j1}$, $C_{j2}$, $C_{j3}$, $C_{j4}$) are orthogonal to each other if i is different from j. In this example, each code word is formed by a set of four code elements (e.g., a set of code elements $C_{i1}$, $C_{i2}$, $C_{i3}$, and $C_{i4}$ forms a code word for the $i^{th}$ STA). In some aspects, the code words are quasi-orthogonal rather than orthogonal. Therefore, by de-spreading the received signal for each four consecutive frequency tones, the AP can identify which station sent the reference frame and the AP can also identify the signal strength/quality of the received reference frame at each frequency sub-band.

Figure 11:
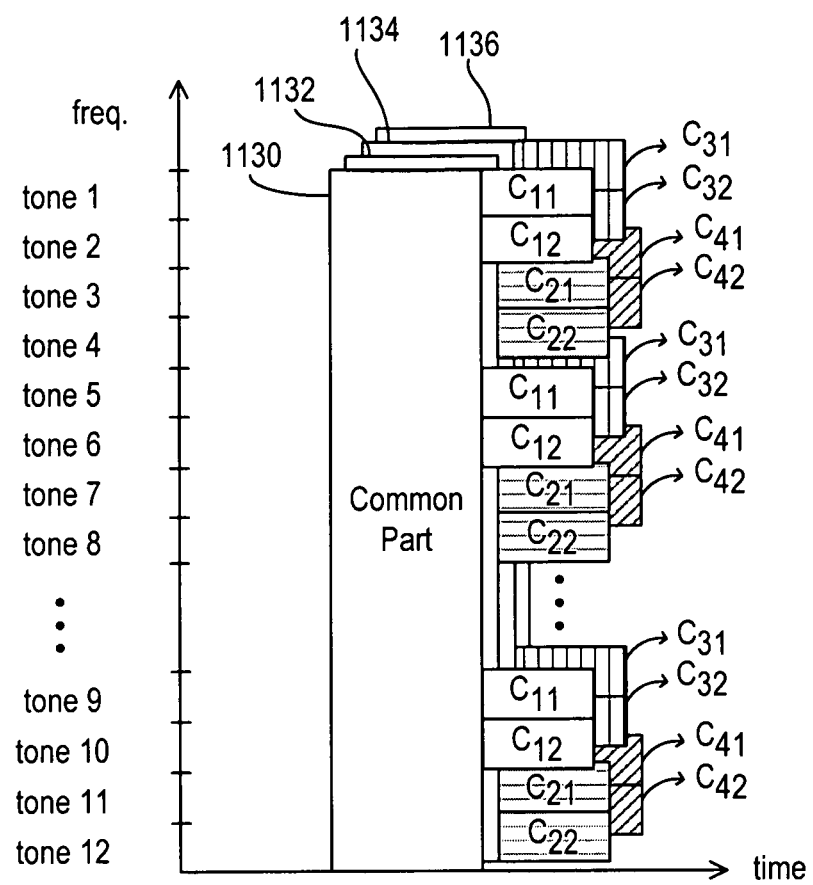
FIG. 11 illustrates an example of an allocation of multiple stations in a reference frame transmission.

FIG. 11 illustrates an example of an allocation of multiple stations in a reference frame transmission, in which CDM and FDM are utilized. STA1 may send a reference frame 1130, STA2 may send a reference frame 1132, STA3 may send a reference frame 1134, and STA4 may send a reference frame 1136. The reference frames 1130, 1132, 1134, and 1136 include a common part, which is the same in each of the reference frames 1130, 1132, 1134, and 1136, and a user-specific part. Each of the common parts of the reference frames 1130, 1132, 1134, and 1136 includes the legacy header. In some examples, the common parts may also include the RL-SIG field, HE-SIG-A field, and/or HE-STF field. In some aspects, the references 1130, 1132, 1134, and 1136 may be PS-Poll frames or modified PS-Poll frames. In some aspects, the reference frames 1130, 1132, 1134, and 1136 may be NDP frames (e.g., contain no HE-DATA field).

In some aspects, each station's transmission resource, including which code element being utilized at which tone and at what time, is predetermined (e.g., known to the station and to the AP). The transmission resource may include an orthogonal signature or a quasi-orthogonal signature allocated to each station by the AP. The signature may be delivered in an HE frame (e.g., 400), such as in the HE-LTF field of the HE frame.

Each STA's user-specific part may span the entire channel bandwidth (or the full-band) over which UL OFDMA transmission occurs but does not occupy all of the tones (or frequencies) within the channel bandwidth (or within the full-band). In one aspect, each STA's user-specific part is modulated and transmitted utilizing some of the tones in the channel bandwidth but spanning the entire channel bandwidth.

In FIG. 11, for illustration purposes, the channel bandwidth (or the full-band) has 12 frequency tones from frequency tone 1 through tone 12. This is simply an illustration, and the number of frequency tones is not limited to these numbers. In other examples, a channel bandwidth may include more frequency tones or less number of frequency tones. Further, it is noted that the ellipses between frequency tones 8 and 9 indicate that one or more additional frequency tones or no frequency tones are present between frequency tones 8 and 9.

As an example, in FIG. 11, each STA's user-specific part is transmitted on half of the total number of tones in the entire channel bandwidth. STA1 and STA3 may transmit on frequency tones 1, 2, 5, 6, 9, and 10, and STA2 and STA4 may transmit on frequency tones 3, 4, 7, 8, 11, and 12. In this example, the frequency tones utilized by STA1 and STA3 do not overlap the frequency tones utilized by STA2 and STA4.

The frequency tones may be grouped into sets of resource units, with each resource unit including, for example, two consecutive frequency tones. For example, for STA1 and STA3, a first resource unit is formed of tones 1 and 2, a second resource unit is formed of tones 5 and 6, and a third resource unit is formed of tones 9 and 10. Similarly, for STA2 and STA4, a first resource unit is formed of tones 3 and 4, a second resource unit is formed of tones 7 and 8, and a third resource unit is formed of tones 11 and 12. An $i^{th}$ STA sends a first code element $C_{i1}$ on a first tone of each resource unit (e.g., tones 1, 5, and 9) and a second code element $C_{i2}$ on a second tone of each resource unit (e.g., tones 2, 6, and 10). The set of two code elements $C_{i1}$ and $C_{i2}$ form a code word for the $i^{th}$ STA. The code word utilized by STA2 and STA4 may be orthogonal to the code word utilized by STA1 and STA3. In some cases, when STA1 and STA3 transmit on the same frequency tones, the user-specific part of STA1 and STA3 may be code multiplexed. Similarly, when STA2 and STA4 transmit on the same frequency tones, the user-specific part of STA2 and STA4 may be code multiplexed.

In FIG. 11, a code word of size two is utilized to separate signals from STA1/STA3, and signals from STA2/STA4. In this manner, STA1 utilizes a code word formed of ($C_{11}$, $C_{12}$), and STA3 utilizes a code word formed of ($C_{31}$, $C_{32}$), where ($C_{11}$, $C_{12}$) and ($C_{31}$, $C_{32}$) are mutually orthogonal. Similarly, STA2 utilizes a code word formed of ($C_{21}$, $C_{22}$), and STA4 utilizes a code word formed of ($C_{41}$, $C_{42}$), where ($C_{21}$, $C_{22}$) and ($C_{41}$, $C_{42}$) are mutually orthogonal.

The combination of the frequency tones and code words can represent a predefined sequence associated with each station. For example, frequency tones 1, 2, 5, 6, 9, and 10 and the associated code words collectively represent the predefined sequence associated with each of STA1 and STA3. Similarly, frequency tones 3, 4, 7, 8, 11, and 12 and the associated code words collectively represent the predefined sequence associated with each of STA2 and STA4.

It should be noted that the code size is not limited to the example shown herein and can utilize other code sizes. Furthermore, while a resource unit described in the example above includes two frequency tones, the number of frequency tones in a resource unit is not limited to this number, and a resource unit can have other numbers of frequency tones.

In one or more other examples, a resource unit can include consecutive and non-consecutive frequency tones. For example, each of STA1 and STA3 may have a resource unit that includes frequency tones 1, 2, 5, 6, 9, and 10, and each of STA2 and STA4 may have a resource unit that includes frequency tones 3, 4, 7, 8, 11, and 12. Although STA1 and STA3 (or STA2 and STA4) have the same resource units, a separate spreading code is applicable to each resource unit such that spreading codes to be applied to the same resource unit by separate stations STA1 and STA3 (or STA2 and STA4) are orthogonal.

With respect to FIGS. 7A through 7C and 9 through 11, in some aspects, the prescribed bandwidth of a station (e.g., STA1, STA2, STA3, STA4) is (i) the entire channel bandwidth (or a full-band) over which UL OFDMA transmission occurs, (ii) a widest bandwidth supported by the station within the entire channel bandwidth, (iii) a bandwidth of a downlink frame (e.g., the frame 510 that precedes a reference frame), or (iv) a widest bandwidth supported by the station within the bandwidth of the downlink frame.

The prescribed bandwidth may include frequency tones (or tones) that are grouped in sets of resource units, with each resource unit including multiple distinct tones, such that multiple distinct tones are grouped in separate resource units. Thus, the prescribed bandwidth of each station may include at least one resource unit, where the resource unit includes multiple distinct tones.

In one or more implementations (e.g., an example of an implementation of FIG. 9), at least one tone in each of the sets of the resource units is associated with each station participating in the uplink multi-user transmission such that the tones for each such station collectively represent the predefined sequence associated with each such station.

In one or more implementations (e.g., examples of implementations of FIGS. 10 and 11), each station participating in the uplink multi-user transmission represents the station's corresponding predefined sequence using tones in each of the resource units, and a separate spreading code (or code) is applicable to each resource unit associated with the respective station such that spreading codes to be applied to the same resource unit by separate stations are orthogonal.

In one or more aspects, a frame may represent a PPDU or a PSDU. For example, each of the frames 712, 714, 920, 1030, 1032, 1034, 1036, 1130, 1132, 1134 and 1136 as illustrated in the figures may represent a PPDU. Each of the frames 512, 514, 516, 518, 722 and 724 as illustrated in the figures may represent a PSDU. The frames 510, 620, and 720 may represent a PPDU or a PSDU.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 12A:
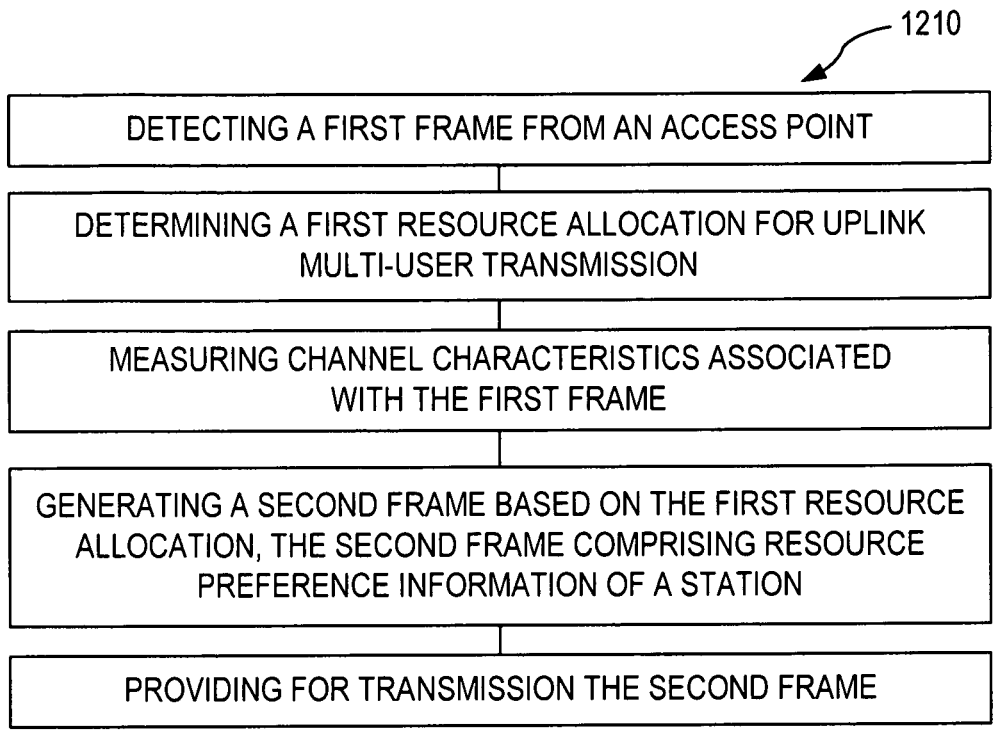
FIGS. 12A, 12B and 12C illustrate flow charts of examples of methods for facilitating wireless communication for multi-user transmission.
Figure 12B:
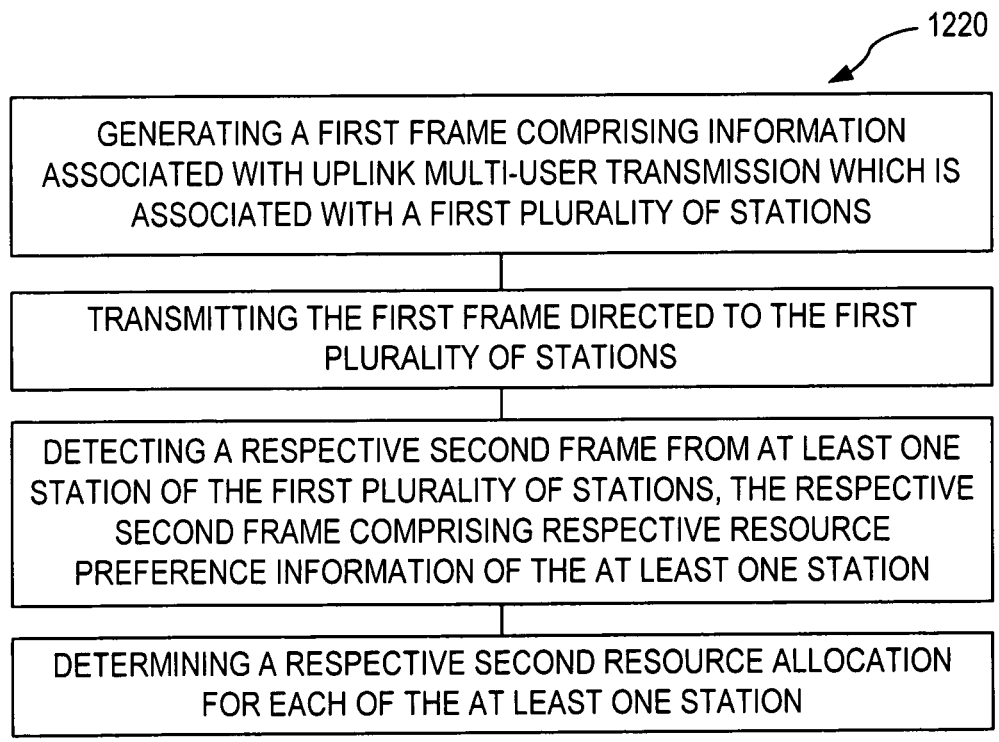
Figure 12C:
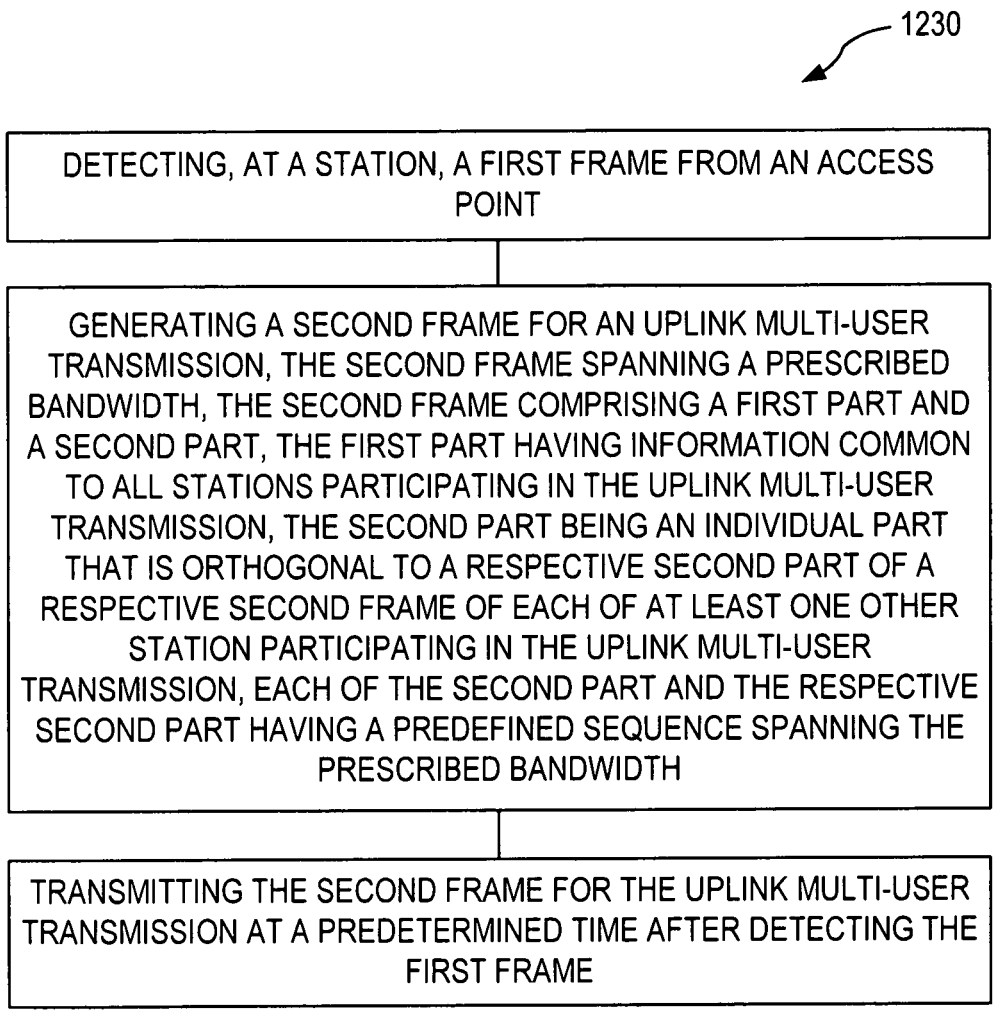

FIGS. 12A, 12B and 12C illustrate flow charts of examples of methods for facilitating wireless communication. For explanatory and illustration purposes, the example processes 1210, 1220 and 1230 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1210, 1220 and 1230 are not limited to the wireless communication devices 111-115 of FIG. 1 or their components, and the example processes 1210, 1220 and 1230 may be performed by some of the devices shown in FIG. 1, or other devices or components. Further for explanatory and illustration purposes, the blocks of the example processes 1210, 1220 and 1230 are described herein as occurring in serial or linearly. However, multiple blocks of the example processes 1210, 1220 and 1230 may occur in parallel. In addition, the blocks of the example processes 1210, 1220 and 1230 need not be performed in the order shown and/or one or more of the blocks/actions of the example processes 1210, 1220 and 1230 need not be performed.

Various examples of aspects of the disclosure are described below as clauses for convenience. These are provided as examples, and do not limit the subject technology. As an example, some of the clauses described below are illustrated in FIGS. 12A, 12B and 12C.

Clause A. A computer-implemented method of facilitating communication in a wireless network for multi-user transmission, the method comprising: detecting, at a station, a first frame from an access point; determining a first resource allocation for uplink multi-user transmission, based on the first frame or based on another frame; measuring channel characteristics associated with the first frame; generating a second frame based on the first resource allocation, the second frame comprising resource preference information of the station, the resource preference information being based on the measured channel characteristics; and providing for transmission the second frame directed to the access point.

Clause B. An access point for facilitating communication in a wireless network for multi-user transmission, the access point comprising: one or more memories; and one or more processors coupled to the one or more memories, the one or more processors configured to cause: generating a first frame, the first frame comprising information associated with uplink multi-user transmission, the uplink multi-user transmission being associated with a first plurality of stations; transmitting the first frame directed to the first plurality of stations; detecting a respective second frame from at least one station of the first plurality of stations, the respective second frame being based on a first resource allocation assigned to the at least one station, the respective second frame comprising respective resource preference information of the at least one station, the respective resource preference information being based on signal characteristics associated with the first frame; and determining a respective second resource allocation for each of the at least one station.

Clause C. A station for facilitating communication in a wireless network, the station comprising: one or more memories; and one or more processors coupled to the one or more memories, the one or more processors configured to cause: detecting, at a station, a first frame from an access point; in response to detecting the first frame, generating a second frame for an uplink multi-user transmission, the second frame spanning a prescribed bandwidth, the second frame comprising a first part and a second part, the first part having information common to all stations participating in the uplink multi-user transmission, the second part being an individual part that is orthogonal to a respective second part of a respective second frame of each of at least one other station participating in the uplink multi-user transmission, each of the second part and the respective second part having a predefined sequence spanning the prescribed bandwidth to enable measurement of channel characteristics associated with the second frame and the respective second frame.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point for facilitating communication in a wireless network for multi-user transmission, the access point comprising:
one or more memories; and
one or more processors coupled to the one or more memories, the one or more processors configured to cause:
generating a first frame, the first frame comprising information associated with uplink multi-user transmission, the uplink multi-user transmission being associated with a first plurality of stations;
transmitting the first frame directed to the first plurality of stations;

detecting a respective second frame from at least one station of the first plurality of stations, the respective second frame being based on a first resource allocation assigned to the at least one station, the respective second frame comprising respective resource preference information of the at least one station, the respective resource preference information being based on signal characteristics associated with the first frame;

determining a respective second resource allocation for each of the at least one station;

determining, for each station of a second plurality of stations, whether the access point has data traffic buffered in the access point to send to the each station, the second plurality of stations comprising the first plurality of stations;

generating a third frame based on the determining of whether the access point has data traffic buffered in the access point to send to the each station; and providing, for transmission, the third frame directed to the second plurality of stations prior to transmitting the first frame, wherein the first frame occupies an entire channel bandwidth, and the third frame occupies a sub-band smaller than the entire channel bandwidth, wherein the third frame indicates that the access point has data traffic pending and buffered in the access point to send to each of the first plurality of stations and has no data traffic pending and buffered in the access point to send to each remaining station of the second plurality of stations, wherein the respective second frame is a high efficiency (HE) frame, wherein the HE frame comprises legacy fields, which are followed by high efficiency (HE) fields, wherein the legacy fields comprise a legacy short training field (L-STF), which is directly followed by a legacy long training field (L-LTF), which is directly followed by a legacy signal (L-SIG) field, which is directly followed by a repeated L-SIG (RL-SIG) field, wherein the HE fields comprise a high-efficiency signal-A (HE-SIG-A) field, which is followed by a high-efficiency short training field (HE-STF), which is followed by a high-efficiency long training field (HE-LTF), wherein a header field of the HE fields comprises a signature allocated to the at least one station by the access point, wherein the signature is orthogonal or quasi-orthogonal, wherein the one or more processors are configured to cause, based on the signature, (a) identifying which station is the at least one station and (b) measuring a channel gain of a channel bandwidth associated with the at least one station, wherein the one or more processors are configured to cause, using only the signature without utilizing a transmitter address (TA) field, a receiver address (RA) field, or an association identifier (AID) field, determining whether the at least one station is ready to receive a frame, wherein the HE frame having the signature excludes a high-efficiency data field (HE-DATA field), and wherein detection of the HE frame having the signature excludes the TA field, the RA field, and the AID field.

2. The access point of claim 1, wherein the first resource allocation comprises a first frequency allocation, the respective second resource allocation comprises a respective second frequency allocation, and the respective resource preference information comprises respective frequency preference information.

3. The access point of claim 1, wherein the one or more processors are configured to cause:
identifying the at least one station associated with the respective second frame based on a bandwidth occupied by the respective second frame.

4. The access point of claim 1, wherein the one or more processors are configured to cause:
generating a fourth frame, the fourth frame comprising information associated with the respective second resource allocation for each of the at least one station; and
providing for transmission the fourth frame.

5. The access point of claim 1, wherein the respective second resource allocation for the at least one station is based at least on the respective resource preference information from the at least one station.

6. The access point of claim 1, wherein the uplink multi-user transmission is an orthogonal frequency division multiple access (OFDMA) transmission.

7. The access point of claim 1, wherein the first plurality of stations is a subset of the second plurality of stations.

8. The access point of claim 1, wherein a count of the first plurality of stations is less than a count of the second plurality of stations.

9. The access point of claim 1, wherein the HE-LTF comprises the signature.

10. A station for facilitating communication in a wireless network, the station comprising:
one or more memories; and
one or more processors coupled to the one or more memories, the one or more processors configured to cause:
detecting, at a station, a first frame from an access point;
in response to detecting the first frame, generating a second frame for an uplink multi-user transmission associated with a first plurality of stations, the second frame spanning a prescribed bandwidth, the second frame comprising a first part and a second part, the first part having information common to all stations participating in the uplink multi-user transmission, the second part being an individual part that is orthogonal to a respective second part of a respective second frame of each of at least one other station participating in the uplink multi-user transmission, each of the second part and the respective second part having a predefined sequence spanning the prescribed bandwidth to enable measurement of channel characteristics associated with the second frame and the respective second frame;
transmitting the second frame for the uplink multi-user transmission, directed to the access point, at a predetermined time after detecting the first frame, to enable the second frame to be combined with the respective second frame to form an uplink multi-user frame; and
detecting, at the station, a third frame directed to a second plurality of stations prior to detecting the first frame, the second plurality of stations comprising the first plurality of stations, the third frame generated based on whether the access point has data traffic buffered in the access point to send to the station, wherein the first frame occupies an entire channel bandwidth, and the third frame occupies a sub-band smaller than the entire channel bandwidth, wherein the third frame indicates that the access point has data traffic pending and buffered in the access point to send to each of the first plurality of stations and has no data traffic pending and buffered in the access point to send to each remaining station of the second plurality of stations, wherein the second frame is a high efficiency (HE) frame, wherein the HE frame comprises legacy fields, which are followed by high efficiency (HE) fields, wherein the legacy fields comprise a legacy short training field (L-STF), which is directly followed by a legacy long training field (L-LTF), which is directly followed by a legacy signal (L-SIG) field, which is directly followed by a repeated L-SIG (RL-SIG) field, wherein the HE fields comprise a high-efficiency signal-A (HE-SIG-A) field, which is followed by a high-efficiency short training field (HE-STF), which is followed by a high-efficiency long training field (HE-LTF), wherein a header field of the HE fields comprises a signature allocated to the station by the access point, wherein the signature is orthogonal or quasi-orthogonal, wherein the HE frame is configured to cause, based on the signature, (a) identifying which station is the station and (b) measuring a channel gain of a channel bandwidth associated with the station, wherein the HE frame is configured to cause, using only the signature without utilizing a transmitter address (TA) field, a receiver address (RA) field, or an association identifier (AID) field, determining whether the station is ready to receive a frame, wherein the HE frame having the signature excludes a high-efficiency data field (HE-DATA field), and wherein transmission of the HE frame having the signature excludes the TA field, the RA field, and the AID field.

11. The station of claim 10, wherein the one or more processors are configured to cause:

detecting a fourth frame from the access point, the fourth frame comprising resource allocation information for the station, the resource allocation information being based on the measurement of the channel characteristics associated with the second frame;

extracting the resource allocation information from the fourth frame; and decoding the fourth frame based on the resource allocation information, wherein the station is configured to decode resources allocated to the station in the resource allocation information.

12. The station of claim 10, wherein the prescribed bandwidth is (1) a bandwidth of the first frame or (2) a widest bandwidth supported by the station within the bandwidth of the first frame.

13. The station of claim 10, wherein:

the prescribed bandwidth comprises a plurality of tones grouped in sets of resource units such that multiple distinct tones are grouped in separate resource units, and at least one tone in each of the sets of the resource units is associated with each station participating in the uplink multi-user transmission such that the tones for the each station collectively represent the predefined sequence associated with the each station.

14. The station of claim 10, wherein:

the prescribed bandwidth comprises a plurality of tones grouped in sets of resource units such that multiple distinct tones are grouped in separate resource units, and each station participating in the uplink multi-user transmission represents the station's corresponding predefined sequence using tones in each of the resource units, wherein a separate spreading code is applicable to each resource unit associated with the respective station such that spreading codes to be applied to the same resource unit by separate stations are orthogonal.

15. The station of claim 10, wherein the first part comprises a legacy header and the second part comprises a non-legacy header.

16. The station of claim 10, wherein the first plurality of stations is a subset of the second plurality of stations.

17. The station of claim 10, wherein a count of the first plurality of stations is less than a count of the second plurality of stations.

18. The station of claim 10, wherein the HE-LTF comprises the signature.

* * * * *